US012586176B2

(12) United States Patent
Chudo et al.

(10) Patent No.: US 12,586,176 B2
(45) Date of Patent: Mar. 24, 2026

(54) SYSTEMS AND METHODS FOR PREDICTING AN INCOMING ROTATIONAL BALANCE OF AN UNFINISHED WORKPIECE

(71) Applicant: Ford Motor Company, Dearborn, MI (US)

(72) Inventors: Beverly Chudo, Oakland, MI (US); Nathaniel David Hansen, Canton, MI (US); Martin H. Jones, Brighton, MI (US); John Harlan Platek, Woodhaven, MI (US)

(73) Assignee: Ford Motor Company, Dearborn, MI (US)

( * ) Notice: Subject to any disclaimer, the term of this patent is extended or adjusted under 35 U.S.C. 154(b) by 480 days.

(21) Appl. No.: 17/984,832

(22) Filed: Nov. 10, 2022

(65) Prior Publication Data

US 2024/0161268 A1     May 16, 2024

(51) Int. Cl.
  *G06T 7/00* (2017.01)
  *G01M 1/12* (2006.01)
  (Continued)
(52) U.S. Cl.
  CPC .............. *G06T 7/001* (2013.01); *G01M 1/12* (2013.01); *G01M 13/00* (2013.01); *G06T 7/11* (2017.01);
  (Continued)
(58) Field of Classification Search
  CPC ......... G06T 7/001; G06T 7/66; G06T 7/0004; G06T 7/12; G06T 7/62; G06T 7/11;
  (Continued)

(56) References Cited

U.S. PATENT DOCUMENTS

| | | |
|---|---|---|
| 8,103,374 B2 | 1/2012 | Yoshimoto |
| 10,047,824 B2 | 8/2018 | Leverington |

(Continued)

FOREIGN PATENT DOCUMENTS

| | | |
|---|---|---|
| CN | 107966245 | 4/2018 |
| CN | 111191329 | 5/2020 |

(Continued)

OTHER PUBLICATIONS

Leu et al, CAD model based virtual assembly simulation, planning and training, CIRP Annals, vol. 62, Issue 2, 2013, p. 799-822, https://doi.org/10.1016/j.cirp.2013.05.005 (Year: 2013).*

(Continued)

*Primary Examiner* — Chan S Park
*Assistant Examiner* — Paulo Andres Garcia
(74) *Attorney, Agent, or Firm* — Burris Law, PLLC

(57) ABSTRACT

A method for predicting an incoming rotational balance of an unfinished workpiece includes obtaining image data of the unfinished workpiece, generating a virtual representation of the unfinished workpiece based on the image data, segmenting the virtual representation into one or more target meshes, determining one or more parameters of the one or more target meshes, where the one or more parameters comprise a volume, a center of gravity, or a combination thereof, and determining a balance metric of the unfinished workpiece based on the one or more parameters and a balance prediction model.

20 Claims, 5 Drawing Sheets

(51) Int. Cl.

| | |
|---|---|
| *G01M 13/00* | (2019.01) |
| *G06T 7/11* | (2017.01) |
| *G06T 7/62* | (2017.01) |
| *G06T 7/66* | (2017.01) |

(52) U.S. Cl.
   CPC .................. *G06T 7/62* (2017.01); *G06T 7/66* (2017.01); *G06T 2207/30164* (2013.01)

(58) Field of Classification Search
   CPC ........... G06T 2207/30164; G06F 30/17; G06F 30/23; G01M 1/14; G01M 1/12; G01M 13/00
   See application file for complete search history.

(56) References Cited

U.S. PATENT DOCUMENTS

| | | | | |
|---|---|---|---|---|
| 10,132,618 | B2 * | 11/2018 | Isei ....................... | G01M 13/02 |
| 10,598,481 | B2 * | 3/2020 | Isei ....................... | G01B 11/24 |
| 12,013,230 | B2 * | 6/2024 | Suzuki .............. | G01B 11/2522 |
| 2008/0083277 | A1 * | 4/2008 | Douglas .................. | G01M 1/14 73/459 |
| 2011/0071806 | A1 * | 3/2011 | Yoshimoto ........... | G05B 19/401 703/1 |
| 2015/0346048 | A1 * | 12/2015 | Rogalla ................... | G01M 1/30 73/66 |
| 2020/0064277 | A1 * | 2/2020 | Hucker ............. | G01N 21/9515 |

FOREIGN PATENT DOCUMENTS

| | | | |
|---|---|---|---|
| CN | 112008411 | | 12/2020 |
| JP | 2007264749 | A * | 10/2007 |
| JP | 2010091283 | A * | 4/2010 |

OTHER PUBLICATIONS

Guarato, A.Z., Quinsat, Y., Mehdi-Souzani, C et al. Conversion of 3D scanned point cloud into a voxel-based representation for crankshaft mass balancing. Int J Adv Manuf Technol 95, 1315-1324 (2018). https://doi.org/10.1007/s00170-017-1319-5 (Year: 2017).*

C. Wen, Y. Zhang, Z. Li, Y. Fu, Pixel2Mesh++: Multi-View 3D Mesh Generation via Deformation, 2019, https://arxiv.org/abs/1908.01491 (Year: 2019).*

C. Gumeli, A. Dai, M. NieBner, ROCA: Robust CAD Model Retrieval and Alignment from a Single Image, 2022, https://doi.org/10.1109/CVPR52688.2022.00399 (Year: 2022).*

A. Zuquete Guarato, Y. Quinsat, C. Mehdi-Souzani, C. Lartigue, E. Sura, Conversion of 3D scanned point cloud into a voxel-based representation for crankshaft mass balancing, International Journal of Advanced Manufacturing Technology, 2018, 10.1007/s00170-017-1319-5. hal-01630551 (Year: 2018).*

Srinagalakshmi Nammi, B. Ramamoorthy, Effect of surface lay in the surface roughness evaluation using machine vision, Optik, vol. 125, Is. 15, 2014, p. 3954-3960, ISSN 0030-4026, https://doi.org/10.1016/j.ijleo.2014.01.152. (Year: 2014).*

* cited by examiner

SYSTEMS AND METHODS FOR PREDICTING AN INCOMING ROTATIONAL BALANCE OF AN UNFINISHED WORKPIECE

FIELD

The present disclosure relates to predicting an incoming rotational balance of an unfinished workpiece.

BACKGROUND

The statements in this section merely provide background information related to the present disclosure and may not constitute prior art.

A vehicle may employ various rotating components during operation, such as a crankshaft, a camshaft, a rotor, and a flex plate. Rotational imbalances of the rotating components may induce a variety of operational constraints within the vehicle. As an example, a rotational imbalance of a crankshaft may induce undesirable engine vibrations. Moreover, identifying and remedying rotational balances are time consuming and resource intensive processes, as it may require an operator to determine a source of the rotational imbalance (e.g., a deviation from one or more nominal forging parameters, a deviation from one or more manufacturing processes and/or parameters, or a combination thereof) and to identify a corrective action to inhibit the rotational imbalance (e.g., drilling holes on an inner counterweight of a crankshaft to inhibit scrap material and cycle times).

SUMMARY

This section provides a general summary of the disclosure and is not a comprehensive disclosure of its full scope or all of its features.

The present disclosure provides a method for predicting an incoming rotational balance of an unfinished workpiece. The method includes obtaining image data of the unfinished workpiece, generating a virtual representation of the unfinished workpiece based on the image data, segmenting the virtual representation into one or more target meshes, determining one or more parameters of the one or more target meshes, where the one or more parameters comprise a volume, a center of gravity, or a combination thereof, and determining a balance metric of the unfinished workpiece based on the one or more parameters and a balance prediction model.

The following paragraph includes variations of the method for predicting an incoming rotational balance of an unfinished workpiece of the above paragraph, which may be implemented individually or in any combination.

In one form, the one or more parameters of the one or more target meshes include a mass, a throw arm dimension, a radius angle, or a combination thereof. In one form, the unfinished workpiece includes one of a crankshaft forging, a camshaft forging, a rotor forging, and a flex plate forging. In one form, the unfinished workpiece includes the crankshaft forging, and the one or more target meshes include one or more counterweight meshes. In one form, the unfinished workpiece includes the crankshaft forging, and where segmenting the virtual representation into one or more target meshes includes performing a Boolean operation to identify one or more counterweight meshes from among the one or more target meshes. In one form, the image data is obtained by one of a light digitizer and a scanner device. In one form, the method further includes generating a modification recommendation in response to the balance metric not satisfying a balance condition, where the modification recommendation indicates one or more corrective actions to be performed on one of the unfinished workpiece and a manufacturing process associated with the unfinished workpiece. In one form, the virtual representation is further based on a computer-aided design (CAD) file associated with the unfinished workpiece.

The present disclosure provides a system for predicting an incoming rotational balance of an unfinished workpiece, the system comprising one or more processors and one or more nontransitory computer-readable mediums comprising instructions that are executable by the one or more processors. The instructions include obtaining image data of the unfinished workpiece, generating a virtual representation of the unfinished workpiece based on the image data, segmenting the virtual representation into one or more target meshes, determining one or more parameters of the one or more target meshes, where the one or more parameters comprise a volume, a center of gravity, or a combination thereof, and determining a balance metric of the unfinished workpiece based on the one or more parameters and a balance prediction model.

The following paragraph includes variations of the system for predicting an incoming rotational balance of an unfinished workpiece of the above paragraph, which may be implemented individually or in any combination.

In one form, the one or more parameters of the one or more target meshes include a mass, a throw arm dimension, a radius angle, or a combination thereof. In one form, the unfinished workpiece includes one of a crankshaft forging, a camshaft forging, a rotor forging, and a flex plate forging. In one form, the unfinished workpiece includes the crankshaft forging, and the one or more target meshes include one or more counterweight meshes. In one form, the unfinished workpiece includes the crankshaft forging, and where the instructions for segmenting the virtual representation into one or more target meshes include performing a Boolean operation to identify one or more counterweight meshes from among the one or more target meshes. In one form, the image data is obtained by one of a light digitizer and a scanner device. In one form, the instructions further comprise generating a modification recommendation in response to the balance metric not satisfying a balance condition, where the modification recommendation indicates one or more corrective actions to be performed on one of the unfinished workpiece and a manufacturing process associated with the unfinished workpiece. In one form, the virtual representation is further based on a computer-aided design (CAD) file associated with the unfinished workpiece.

The present disclosure provides a method for predicting an incoming rotational balance of a crankshaft forging. The method includes obtaining image data of the crankshaft forging, generating a virtual representation of the crankshaft forging based on the image data and a computer-aided design (CAD) file associated with the crankshaft forging, segmenting the virtual representation into one or more counterweight meshes, determining one or more parameters of the one or more counterweight meshes, where the one or more parameters comprise a volume, a center of gravity, or a combination thereof, and determining a balance metric of the crankshaft forging based on the one or more parameters and a balance prediction model.

The following paragraph includes variations of the method for predicting an incoming rotational balance of a crankshaft forging of the above paragraph, which may be implemented individually or in any combination.

In one form, the one or more parameters of the one or more target meshes include a mass, a throw arm dimension, a radius angle, or a combination thereof. In one form, segmenting the virtual representation into one or more target meshes includes performing a Boolean operation to identify one or more counterweight meshes from among the one or more target meshes. In one form, the method further includes generating a modification recommendation in response to the balance metric not satisfying a balance condition, where the modification recommendation indicates one or more corrective actions to be performed on one of the crankshaft forging and a manufacturing process associated with the crankshaft forging.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
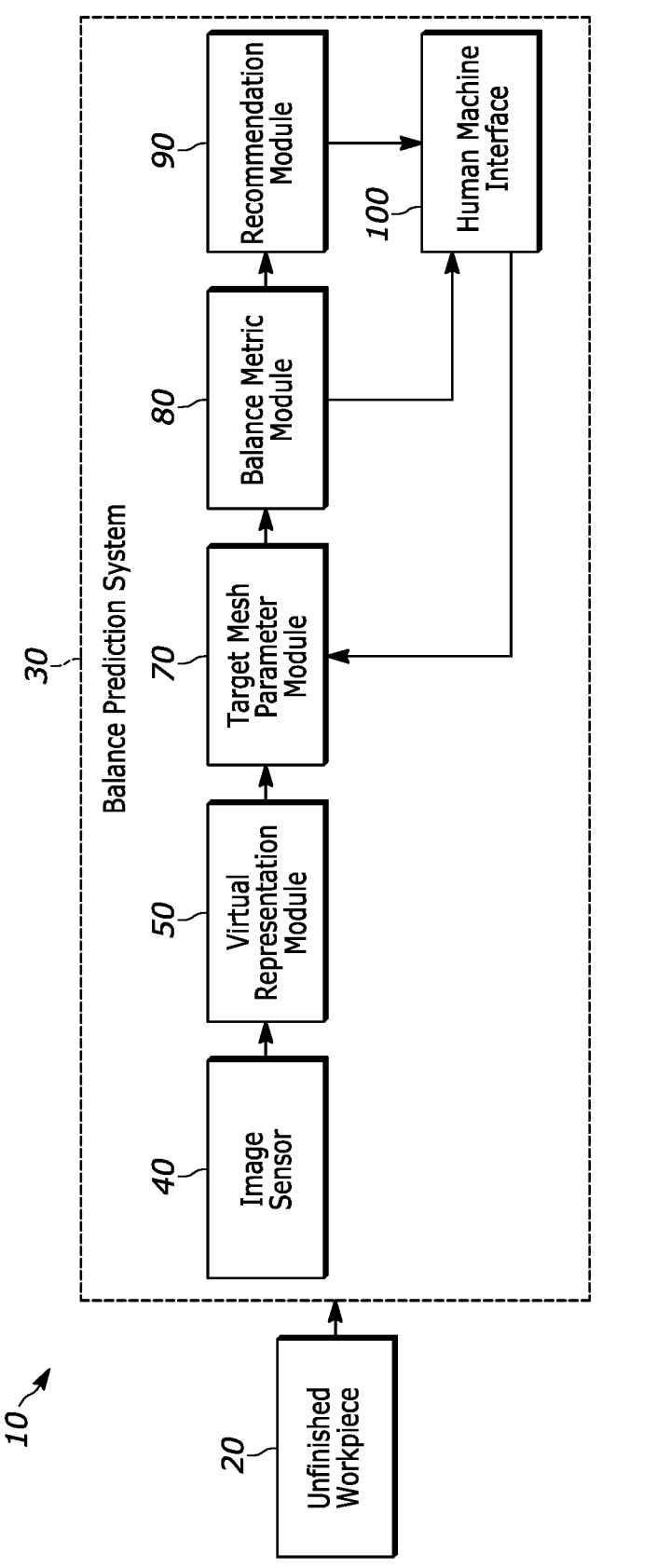
FIG. 1 is a functional block diagram of an unfinished workpiece and a balance prediction system for predicting a rotational balance of the unfinished workpiece in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for predicting a rotational balance of an unfinished workpiece. A balance prediction system generates a virtual representation of the unfinished workpiece based on image data obtained from an image sensor and segments the virtual representation into one or more target meshes. The balance prediction system determines one or more parameters of the one or more target meshes and a balance metric of the unfinished workpiece based on the one or more parameters and a balance prediction model. By determining the balance metric based on one or more determined parameters of the virtual representation and the balance prediction model, the source and magnitude of the rotational imbalance can be readily identified and remedied by an operator, thereby inhibiting the time and resources employed during the identification and correction of rotational imbalances. Additionally, the systems and methods described herein provide for virtual design of experiments to predict the rotational imbalance of unfinished workpieces without physically manufacturing the unfinished workpieces, thereby inhibiting the time and resources employed for testing multiple design variations of the unfinished workpieces.

Referring to FIG. 1, a system 10 is provided and generally includes an unfinished workpiece 20 and a balance prediction system 30. In one form, the balance prediction system 30 includes an image sensor 40, a virtual representation module 50, a target mesh parameter module 70, a balance prediction module 80, a recommendation module 90, and a human machine interface (HMI) 100. It should be readily understood that any one of the components of the balance prediction system 30 can be provided at the same location or distributed at different locations (e.g., via one or more edge computing devices) and communicably coupled accordingly. In one form, the components of the balance prediction system 30 are communicably coupled using a wired or a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

In one form, the unfinished workpiece 20 is provided by any component that is configured to rotate after it is subjected to a manufacturing transformation (e.g., a forging and machining process) and thereby in a finished state. As an example, and in a vehicle manufacturing environment, the unfinished workpiece 20 may include a crankshaft forging, a camshaft forging, a rotor forging, a flex plate forging, or a combination thereof. Accordingly, when the unfinished workpiece 20 is subjected to a forging process (e.g., a cold forging process, a warm forging process, or a hot forging process), the unfinished workpiece 20 may be converted to a finished workpiece, such as a crankshaft, a camshaft, a rotor, a flex plate, among other components that are configured to rotate in a vehicle. It should be understood that the unfinished workpiece 20 may be provided by other example types of forgings/components that are rotatable within other systems/apparatuses and are not limited to the examples described herein.

The image sensor 40 is configured to obtain image data of the unfinished workpiece 20. In one form, the image data is indicative of dimensional parameters of the unfinished workpiece 20 (e.g., length, width, area, volume, alignment relative to a predefined coordinate system defined by one or more cast locators, among other dimensional parameters) or surface parameters of the unfinished workpiece 20 (e.g., a surface roughness, surface lay patterns, surface waviness, among other surface parameters). As an example, the image sensor 40 may include, but is not limited to, a light digitizer, a digital micrometer, a two-dimensional (2D) camera, a three-dimensional (3D) camera, an optical sensor, or a scanner device (e.g., a radar scanner, a laser scanner, a light detection and ranging (LIDAR) sensor, an ultrasonic sensor, an infrared sensor, among other scanner devices). It should be understood that the image sensor 40 may be provided by any type of sensor configured to detect the dimensional and surface parameters of the unfinished workpiece 20 and is not limited to the examples described herein.

Figure 2:
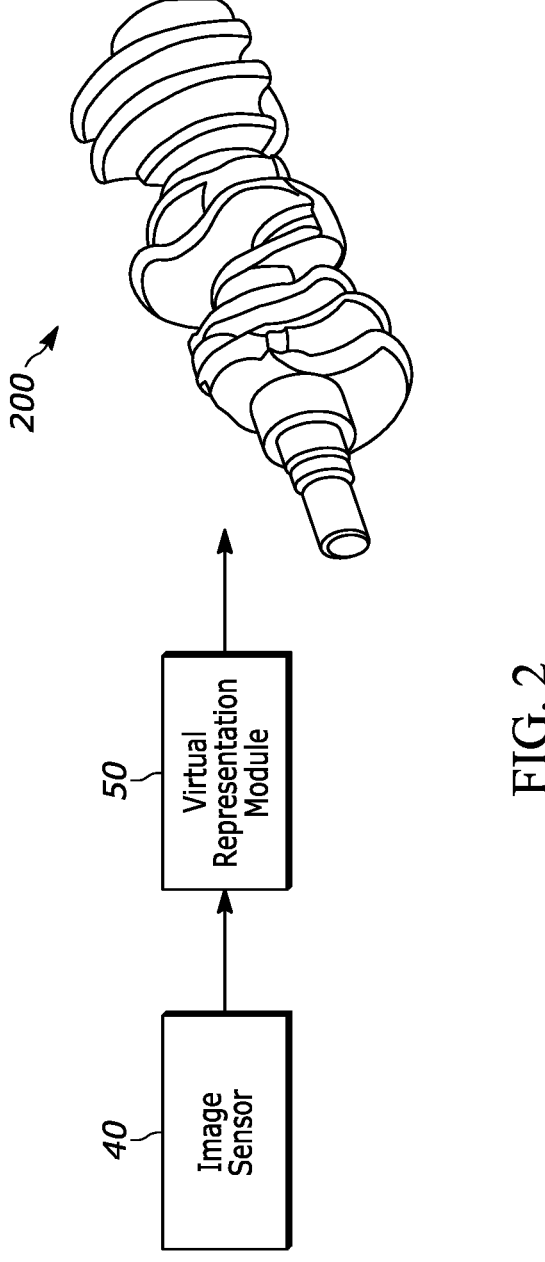
FIG. 2 illustrates a virtual representation generated by the balance prediction system in accordance with the teachings of the present disclosure.

The virtual representation module 50 is configured to generate a virtual representation of the unfinished workpiece 20 based on the image data. In one form, the virtual representation module 50 may perform an artificial intelligence routine (e.g., convolutional neural network-based routines, deep neural network-based routines, among others), a machine learning routine, a computer vision routine, and/or any other type of image processing routine based on the image data to determine the dimensional and surface parameters of the unfinished workpiece 20 and generate the corresponding virtual representation. In one form, the virtual representation may be a mesh representation of the unfinished workpiece 20, a 2D/3D model of the unfinished workpiece 20 (e.g., a computer-aided design (CAD) model, a standard tessellation language (STL) model, among other 2D/3D models), a synthetic image of the unfinished workpiece 20, among other types of virtual representations of the unfinished workpiece 20. In one form, the virtual representation module 50 may be employed by known virtual representation rendering systems, such as Innovmetric® Polyworks. As a specific example and referring to FIGS. 1-2, the virtual representation module 50 may generate a virtual representation of a crankshaft forging (VRCF) 200 based on the image data and the corresponding surface and dimensional parameters.

Figure 3:
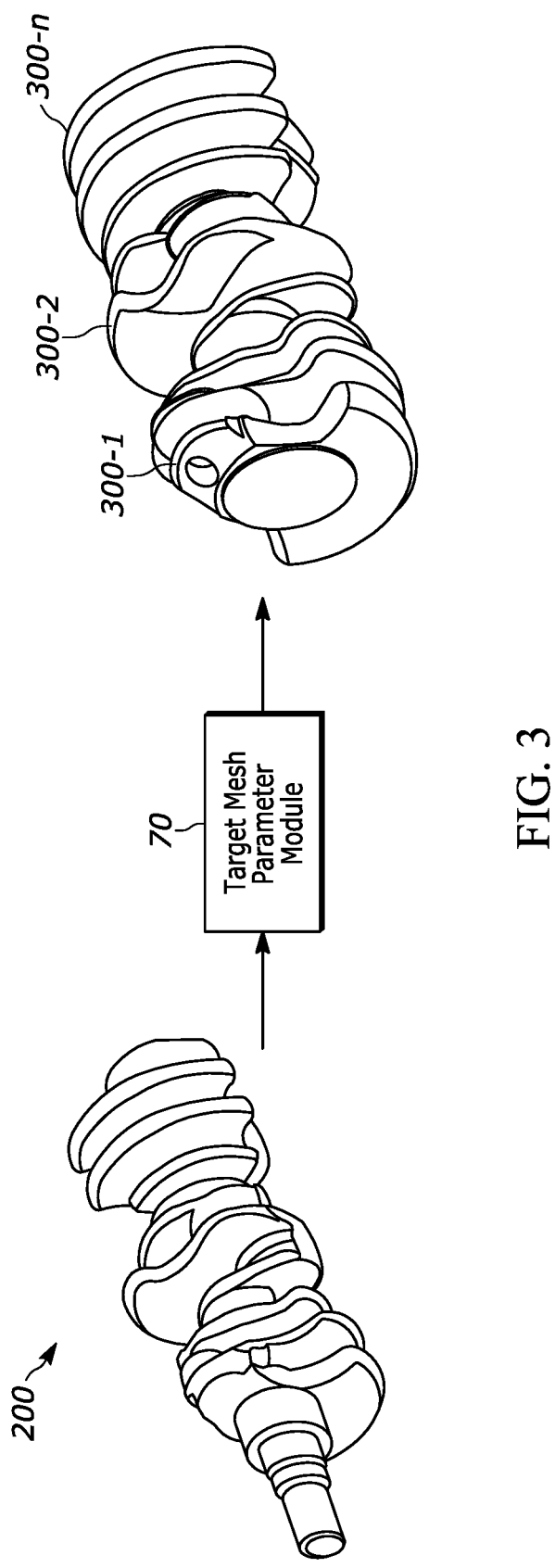
FIG. 3 illustrates one or more target meshes generated by the balance prediction system in accordance with the teachings of the present disclosure.

In one form and referring to FIG. 1, the target mesh parameter module 70 segments the virtual representation into one or more target meshes. As an example, the target mesh parameter module 70 segments the virtual representation into the one or more target meshes by performing one or more Boolean operations to identify the one or more target meshes. In one form, the one or more Boolean operations include performing a subtraction operation to remove nominal machining surfaces from the virtual representation, where the nominal machining surfaces are represented as data and/or objects in a CAD file. It should be understood that other types of Boolean operations may be performed to identify the one or more target meshes, such as a union operation, an intersect operation, a box operation, a wedge operation, a cone operation, a sphere operation, a cylinder operation, a torus operation, a pyramid operation, among other types of Boolean operations. As a specific example and referring to FIGS. 1 and 3, the target mesh parameter module 70 performs one or more subtraction operations (as the Boolean operations) to segment the VRCF 200 into one or more target meshes, such as counterweight meshes 300-1, 300-2, . . . 300-*n* (collectively referred to hereinafter as "counterweight meshes 300") that correspond to one or more counterweights of the crankshaft (as the unfinished workpiece 20). It should be understood that the target meshes may correspond to other portions of the unfinished workpiece 20, such as a crank web, a crank pin, a flywheel mounting flange, a main journal, among other portions of the unfinished workpiece 20.

In one form, the target mesh parameter module 70 is configured to determine one or more parameters of the one or more target meshes. As an example, the target mesh parameter module 70 determines the one or more parameters of the counterweight meshes 300 by employing parameter estimation/determination systems that employ known routines for estimating or determining the one or more parameters of the counterweight meshes 300, such as Innovmetric® Polyworks. As another example, the target mesh parameter module 70 determines the one or more parameters of the counterweight meshes 300 based on an input received via the HMI 100, which may be provided by an input device (e.g., a keyboard, mouse, among other input devices), a graphical user interface (e.g., a touchscreen display or other type of display device), and/or other types of HMIs configured to receive inputs from an operator.

In one form, the one or more parameters of the one or more target meshes include a volume, a density, a mass, a throw arm dimension (i.e., a distance from a center of rotation of the target mesh), a radius angle (i.e., an angle relative to a center of rotation of the target mesh), and/or a center of gravity. It should be understood that the one or more parameters may include other parameters of the target meshes and are not limited to the examples described herein.

In one form, the balance prediction module 80 determines a balance metric of the unfinished workpiece 20 based on the one or more parameters and a balance prediction model. In one form, the balance metric is a textual and/or numeric representation of the rotational balance of the unfinished workpiece 20. As an example implementation of the balance prediction model, the balance prediction module 80 may obtain, for each of the target meshes, a product of the center of gravity and the mass to generate a plurality of two-dimensional or three-dimensional rotational inertia values. Additionally, the balance prediction module 80 may determine a sum of the two-dimensional or three-dimensional rotational inertia values, and the sum may correspond to the balance metric.

As another example implementation of the balance prediction model, the balance prediction module 80 may determine the sum of the two-dimensional or three-dimensional rotational inertia values (as described above). Subsequently, the balance prediction module 80 may determine a moment of inertia of a reference location of the unfinished workpiece 20 (e.g., a bobweight, crank web, crank pin, etc.) based on the sum of the rotational inertia values and a displacement from the reference location, where the moment of inertia corresponds to the balance metric. It should be understood that the balance prediction model may employ other arithmetic relations and/or other combinations of the parameters to determine the balance metric and are not limited to the examples described herein.

Figure 5:
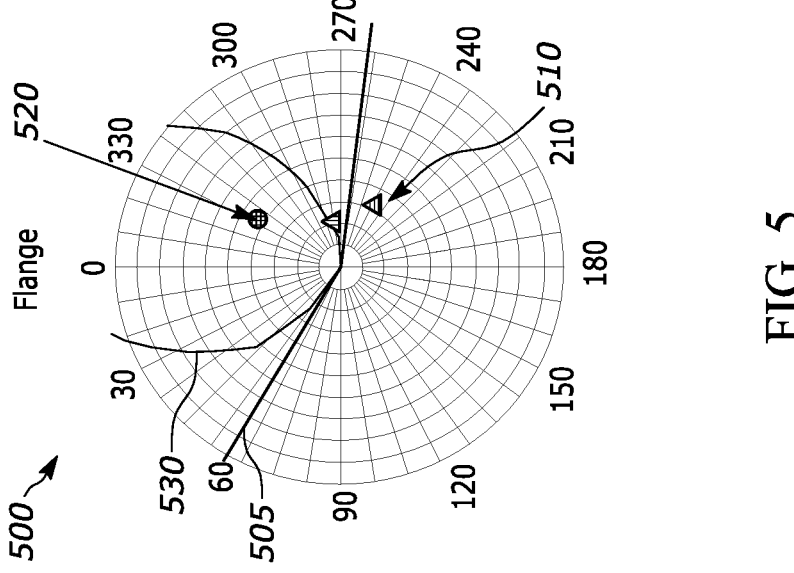
FIG. 5 illustrates a plot indicative of a balance metric in accordance with the teachings of the present disclosure.
Figure 4:
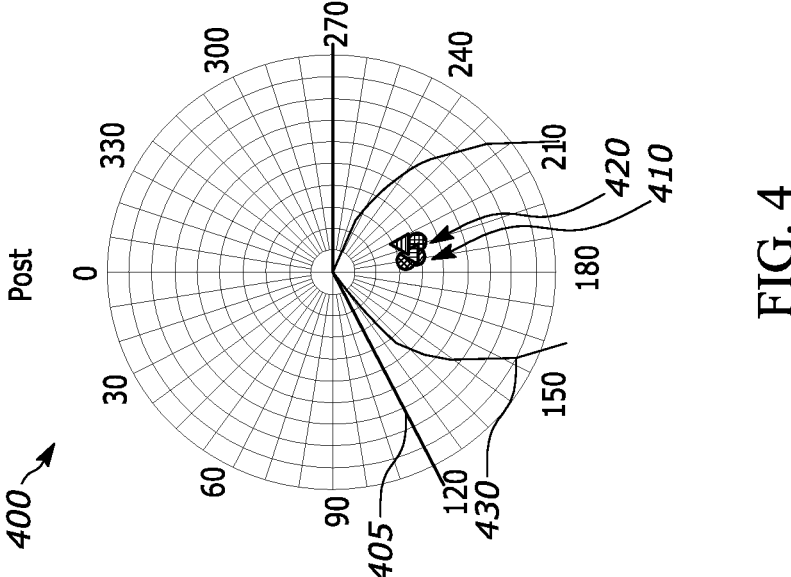
FIG. 4 illustrates a plot indicative of a balance metric in accordance with the teachings of the present disclosure.

In one form, the recommendation module 90 may determine, based on known balance correction routines, a correction rotational inertia magnitude (CRIM) and a correction rotational inertia angle (CRIA) based on at least one of the moment of inertia, the displacement from the reference location, and the sum of the rotational inertia values. Additionally, the recommendation module 90 may instruct the HMI 100 to generate one or more textual, numeric, and/or pictorial elements based on the CRIM and CRIA. As an example and as shown in FIGS. 4-5, the HMI 100 displays polar plots 400, 500 corresponding to the CRIM and CRIA relative to a post end of the crankshaft (illustrated by post end contour 405) and a flange end of the crankshaft (illustrated by flange end contour 505), respectively. Specifically, the CRIM and CRIA relative to the post end is illustrated as data point 410 of the polar plot 400, and the CRIM and CRIA relative to the flange end is illustrated as data point 510 of the polar plot 500.

In one form, the recommendation module 90 is configured to generate a modification recommendation based on the balance metric and a balance condition. As an example, the polar plots 400, 500 may include target data points 420, 520, respectively, which indicate a predetermined or target rotational inertia magnitude and angle defined by, for example, a reference CAD file of the unfinished workpiece 20. If the CRIM and/or CRIA of the data points 410, 510 deviate from the CRIM and/or CRIA of the target data points 420, 520, respectively, beyond a threshold amount (i.e., the balance metric does not satisfy the balance condition), the recommendation module 90 is configured to generate the modification recommendation. If the CRIM and CRIA of the data points 410, 510 do not deviate from the CRIM and CRIA of the target data points 420, 520, respectively, beyond the threshold amount (i.e., the balance metric satisfies the balance condition), the recommendation module 90 does not generate the modification recommendation.

In one form, the polar plots 400, 500 include threshold contours 430, 530 that may be defined based on a portion of the post end contour 405 and the flange end contour 505, respectively, and to encapsulate predefined angular ranges of the post end contour 405 and flange end contour 505 for various CRIM values. As an example and as shown in FIG. 4, the threshold contour 430 may have a first angular range (e.g., 120 degrees) defined about a center-point of the post end contour 405 (i.e., 160 degrees) for CRIM values that are greater than 0 and less than a first predefined post end CRIM value. Furthermore, the threshold contour 430 may incrementally decrease the angular range to a second angular range value (e.g., 60 degrees) as the CRIM value increases from the first predefined post end CRIM value to a second predefined post end CRIM value. As another example and as shown in FIG. 5, the threshold contour 530 may have a first angular range (e.g., 120 degrees) defined about a center-point of the flange end contour 505 (i.e., 160 degrees) for CRIM values that are greater than 0 and less than a first predefined flange end CRIM value. Furthermore, the threshold contour 530 may incrementally decrease the angular range to a second angular range value (e.g., 60 degrees) as the CRIM value increases from the first predefined flange end CRIM value to a second predefined flange end CRIM value.

In one form, the modification recommendation is based on the position of the data points relative to the threshold contours 430, 530. In one form, data points that are provided within an area of the polar plots 400, 500 that are encapsulated or surrounded by threshold contours 430, 530 indicate that the source of the rotational imbalance is associated with the forging process. Additionally, data points that are provided within an area of the polar plots 400, 500 that are not encapsulated or surrounded by the threshold contours 430, 530 indicate that the source of the rotational imbalance is associated with a manufacturing process that occurs after the forging process, such as a machining process. As such, the recommendation module 90 may instruct the HMI 100 to generate an alert/notification corresponding to the source of the rotational imbalance and instructions for performing one or more corrective actions on the unfinished workpiece 20 to thereby more closely align the data points 410, 510 to the target data points 420, 520.

As an example and as shown in FIG. 4, the data point 410 is encapsulated and surrounded by the threshold contour 430. As such, the modification recommendation may provide an alert or notification indicating the source of the deviation from the target data point 420 as being the forging process and/or one or more corrective actions to be performed during the forging process to align the data point 410 more closely to the target data point 420. Example corrective actions associated with the forging process include, but are not limited to, adding or removing material to one or more of the counterweights of the crankshaft (as the unfinished workpiece 20).

As another example and as shown in FIG. 5, the data point 510 is not encapsulated and surrounded by the threshold contour 530. As such, the modification recommendation may provide an alert or notification indicating the source of the deviation from the target data point 520 as being the subsequent manufacturing process and/or one or more corrective actions to be performed during the subsequent manufacturing process to align the data point 510 more closely to the target data point 520. Example corrective actions associated with the machining process include, but are not limited to, adjusting one or more parameters of a machining process.

Figure 6:
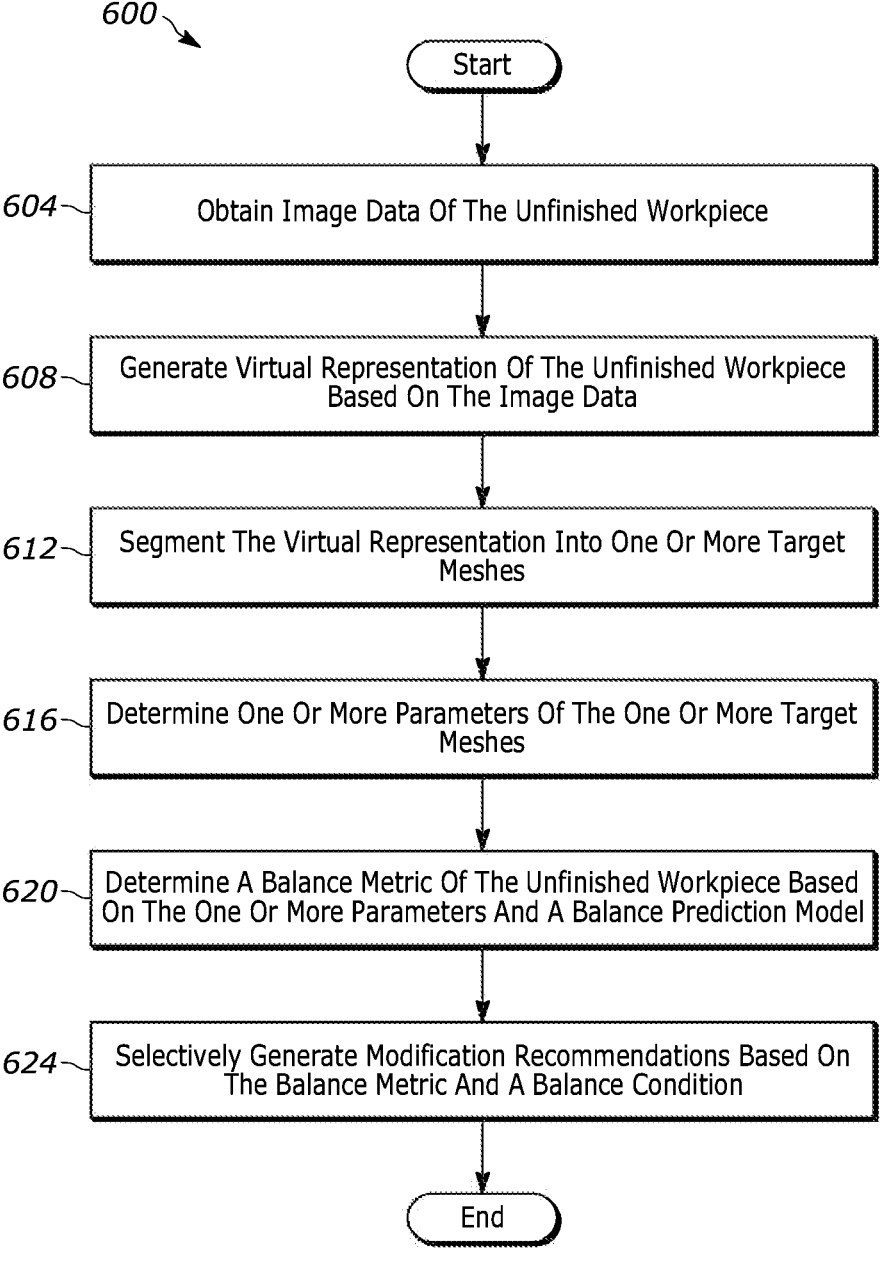
FIG. 6 is a flowchart of an example routine for calibrating a radar system in accordance with the teachings of the present disclosure.

Referring to FIG. 6, a routine 600 for predicting an incoming rotational balance of the unfinished workpiece 20 is shown. At 604, the balance prediction system 30 obtains, via the image sensors 40, image data of the unfinished workpiece 20. At 608, the balance prediction system 30 generates a virtual representation of the unfinished workpiece 20 based on the image data (e.g., the VRCF 200). At 612, the balance prediction system 30 segments the virtual representation into one or more target meshes (e.g., the counterweight meshes 300). At 616, the balance prediction system 30 determines one or more parameters of the one or more target meshes, and at 620, the balance prediction system 30 determines a balance metric of the unfinished workpiece 20 based on the one or more parameters and a balance prediction model. At 624, the balance prediction system 30 selectively generates a modification recommendation based on the balance metric and the balance condition.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for predicting an incoming rotational balance of an unfinished workpiece, the method comprising:
obtaining image data of the unfinished workpiece;
performing an image processing routine based on the image data to (i) determine surface parameters and dimensional parameters of the unfinished workpiece and to (ii) generate a virtual representation of the unfinished workpiece based on the image data, and the surface parameters, and the dimensional parameters, wherein the surface parameters include a surface roughness, one or more surface lay patterns, and a surface waviness, and wherein the dimensional parameters indicate an alignment relative to a predefined coordinate system defined by one or more cast locators;
segmenting the virtual representation into one or more target meshes;
determining one or more parameters of the one or more target meshes, wherein the one or more parameters comprise a volume, a center of gravity, or a combination thereof; and
determining a balance metric of the unfinished workpiece based on the one or more parameters and a balance prediction model.

2. The method of claim 1, wherein the one or more parameters of the one or more target meshes include a mass, a throw arm dimension, a radius angle, or a combination thereof.

3. The method of claim 1, wherein the unfinished workpiece includes one of a crankshaft forging, a camshaft forging, a rotor forging, and a flex plate forging.

4. The method of claim 3, wherein:
the unfinished workpiece includes the crankshaft forging; and
the one or more target meshes include one or more counterweight meshes.

5. The method of claim 3, wherein the unfinished workpiece includes the crankshaft forging, and wherein segmenting the virtual representation into one or more target meshes includes performing a Boolean operation to identify one or more counterweight meshes from among the one or more target meshes.

6. The method of claim 1, wherein the image data is obtained by one of a light digitizer and a scanner device.

7. The method of claim 1 further comprising generating a modification recommendation in response to the balance metric not satisfying a balance condition, wherein the modification recommendation indicates one or more corrective actions to be performed on one of the unfinished workpiece and a manufacturing process associated with the unfinished workpiece.

8. The method of claim 1, wherein the virtual representation is further based on a computer-aided design (CAD) file associated with the unfinished workpiece.

9. A system for predicting an incoming rotational balance of an unfinished workpiece, the system comprising:

one or more processors and one or more nontransitory computer-readable mediums comprising instructions that are executable by the one or more processors, wherein the instructions include:
obtaining image data of the unfinished workpiece;
performing an image processing routine based on the image data to (i) determine surface parameters and dimensional parameters of the unfinished workpiece and to (ii) generate a virtual representation of the unfinished workpiece based on the image data, and the surface parameters, and the dimensional parameters, wherein the surface parameters include a surface roughness, one or more surface lay patterns, and a surface waviness, and wherein the dimensional parameters indicate an alignment relative to a predefined coordinate system defined by one or more cast locators;
segmenting the virtual representation into one or more target meshes;
determining one or more parameters of the one or more target meshes, wherein the one or more parameters comprise a volume, a center of gravity, or a combination thereof; and
determining a balance metric of the unfinished workpiece based on the one or more parameters and a balance prediction model.

10. The system of claim 9, wherein the one or more parameters of the one or more target meshes include a mass, a throw arm dimension, a radius angle, or a combination thereof.

11. The system of claim 9, wherein the unfinished workpiece includes one of a crankshaft forging, a camshaft forging, a rotor forging, and a flex plate forging.

12. The system of claim 11, wherein:
the unfinished workpiece includes the crankshaft forging; and
the one or more target meshes include one or more counterweight meshes.

13. The system of claim 11, wherein the unfinished workpiece includes the crankshaft forging, and wherein the instructions for segmenting the virtual representation into one or more target meshes include performing a Boolean operation to identify one or more counterweight meshes from among the one or more target meshes.

14. The system of claim 9, wherein the image data is obtained by one of a light digitizer and a scanner device.

15. The system of claim 9, wherein the instructions further comprise generating a modification recommendation in response to the balance metric not satisfying a balance condition, wherein the modification recommendation indicates one or more corrective actions to be performed on one of the unfinished workpiece and a manufacturing process associated with the unfinished workpiece.

16. The system of claim 9, wherein the virtual representation is further based on a computer-aided design (CAD) file associated with the unfinished workpiece.

17. A method for predicting an incoming rotational balance of a crankshaft forging, the method comprising:
obtaining image data of the crankshaft forging;
performing an image processing routine based on the image data to (i) determine surface parameters and dimensional parameters of the crankshaft forging and to (ii) generate a virtual representation of the crankshaft forging based on the image data, a computer-aided design (CAD) file associated with the crankshaft forging, the surface parameters, and the dimensional parameters, wherein the surface parameters include a surface roughness, one or more surface lay patterns, and a surface waviness, and wherein the dimensional parameters indicate an alignment relative to a predefined coordinate system defined by one or more cast locators;

segmenting the virtual representation into one or more counterweight meshes;

determining one or more parameters of the one or more counterweight meshes, wherein the one or more parameters comprise a volume, a center of gravity, or a combination thereof; and determining a balance metric of the crankshaft forging based on the one or more parameters and a balance prediction model.

18. The method of claim 17, wherein the one or more parameters of the one or more counterweight meshes include a mass, a throw arm dimension, a radius angle, or a combination thereof.

19. The method of claim 17, wherein segmenting the virtual representation into the one or more counterweight meshes includes performing a Boolean operation to identify one or more counterweight meshes from among the one or more counterweight meshes.

20. The method of claim 17 further comprising generating a modification recommendation in response to the balance metric not satisfying a balance condition, wherein the modification recommendation indicates one or more corrective actions to be performed on one of the crankshaft forging and a manufacturing process associated with the crankshaft forging.

* * * * *